(12) United States Patent
Jiang et al.

(10) Patent No.: US 12,375,648 B2
(45) Date of Patent: Jul. 29, 2025

(54) SYSTEMS AND METHODS FOR IMAGE PREDICTION

(71) Applicant: ZHEJIANG DAHUA TECHNOLOGY CO., LTD., Zhejiang (CN)

(72) Inventors: Dong Jiang, Hangzhou (CN); Jucai Lin, Hangzhou (CN); Jun Yin, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 75 days.

(21) Appl. No.: 18/171,365

(22) Filed: Feb. 19, 2023

(65) Prior Publication Data

US 2023/0199178 A1 Jun. 22, 2023

Related U.S. Application Data

(63) Continuation of application No. PCT/CN2022/087831, filed on Apr. 20, 2022.

(30) Foreign Application Priority Data

Jun. 23, 2021 (CN) .......... 202110700504.4
Jul. 26, 2021 (CN) .......... 202110846640.4

(51) Int. Cl.
*H04N 19/159* (2014.01)
*H04N 19/105* (2014.01)
(Continued)

(52) U.S. Cl.
CPC ......... *H04N 19/107* (2014.11); *H04N 19/105* (2014.11); *H04N 19/139* (2014.11);
(Continued)

(58) Field of Classification Search
CPC .. H04N 19/107; H04N 19/105; H04N 19/139; H04N 19/156; H04N 19/167;
(Continued)

(56) References Cited

U.S. PATENT DOCUMENTS

2005/0078755 A1 4/2005 Woods et al.
2014/0334551 A1 11/2014 Kim et al.
(Continued)

FOREIGN PATENT DOCUMENTS

CN 102314694 A 1/2012
CN 111279702 A 6/2020
(Continued)

OTHER PUBLICATIONS

The Extended European Search Report in European Application No. 22827156.5 mailed on Nov. 27, 2023, 12 pages.
(Continued)

*Primary Examiner* — Jamie J Atala
*Assistant Examiner* — Mahmoud Kamal Abouzahra
(74) *Attorney, Agent, or Firm* — METIS IP LLC

(57) ABSTRACT

The present disclosure relates to systems and methods for image prediction in video processing. A method may include obtaining a target block that has been predicted in an image frame. The method may also include determining, from the target block, one or more target regions to be compensated. The one or more target regions may be adjacent to at least one boundary of the target block. Each of the one or more target regions may have a predictive value. The method may further include, for a target region of the one or more target regions, determining an updated predictive value of the target region based on the predictive value of the target region and pixel values of pixels in a reference region corresponding to the target region.

17 Claims, 7 Drawing Sheets

(51) Int. Cl.

| | |
|---|---|
| *H04N 19/107* | (2014.01) |
| *H04N 19/139* | (2014.01) |
| *H04N 19/156* | (2014.01) |
| *H04N 19/167* | (2014.01) |
| *H04N 19/172* | (2014.01) |
| *H04N 19/176* | (2014.01) |
| *H04N 19/52* | (2014.01) |
| *H04N 19/593* | (2014.01) |

(52) U.S. Cl.
CPC ......... *H04N 19/156* (2014.11); *H04N 19/167* (2014.11); *H04N 19/172* (2014.11); *H04N 19/176* (2014.11); *H04N 19/52* (2014.11); *H04N 19/593* (2014.11)

(58) Field of Classification Search
CPC .... H04N 19/172; H04N 19/176; H04N 19/52; H04N 19/593; H04N 19/503; H04N 19/159
USPC .................................................... 375/240.13
See application file for complete search history.

(56) References Cited

U.S. PATENT DOCUMENTS

| | | | |
|---|---|---|---|
| 2016/0295215 A1 | 10/2016 | Hsu | |
| 2018/0184116 A1 | 6/2018 | Takeuchi et al. | |
| 2019/0158876 A1* | 5/2019 | Liu | H04N 19/583 |
| 2019/0191171 A1 | 6/2019 | Ikai | |
| 2020/0014947 A1 | 1/2020 | Abe et al. | |
| 2020/0396478 A1 | 12/2020 | Ma et al. | |
| 2021/0014489 A1 | 1/2021 | Nemoto et al. | |
| 2021/0289210 A1 | 9/2021 | Tourapis et al. | |
| 2022/0038691 A1 | 2/2022 | Li et al. | |
| 2022/0217337 A1 | 7/2022 | Jiang et al. | |
| 2022/0256141 A1* | 8/2022 | Filippov | H04N 19/105 |
| 2022/0303533 A1* | 9/2022 | Deng | H04N 19/537 |
| 2022/0345692 A1* | 10/2022 | Li | H04N 19/132 |
| 2024/0291965 A1* | 8/2024 | Chen | H04N 19/51 |

FOREIGN PATENT DOCUMENTS

| | | |
|---|---|---|
| CN | 113596474 A | 11/2021 |
| CN | 113691810 A | 11/2021 |
| JP | 2008092352 A | 4/2008 |
| WO | 2021061018 A1 | 4/2021 |

OTHER PUBLICATIONS

Chen, Jianle et al., Algorithm Description for Versatile Video Coding and Test Model 3 (VTM 3), JVET-L1002-v1, 2018, 48 pages.
Jin, Xin et al., Combined Inter-Intra Prediction For High Definition Video Coding, Picture Coding Symposium, 2007, 4 pages.
Chiang, Man-Shu et al., CE10.1.1: Multi-hypothesis Prediction for Improving AMVP Mode, Skip or Merge Mode, and Intra Mode, JVET-L0100-v3, 2018, 14 pages.
Zeng, Feiyang et al., Non-Ce4: Intra Prediction Mode of Clip Selection Using Left And Above Adjacent Coded Block, JVET-P0286, 2019, 2 pages.
International Search Report in PCT/CN2022/087831 mailed on Jul. 22, 2022, 4 pages.
Written Opinion in PCT/CN2022/087831 mailed on Jul. 20, 2022, 5 pages.
First Office Action in Chinese Application No. CN202110846640.4 mailed on Mar. 2, 2022, 15 pages.
First Office Action in Chinese Application No. 202110700504.4 mailed on Apr. 6, 2022, 15 pages.
Telecommunication Standardization Sector of ITU, ITU-T H.265, 2015, 635 pages.
Telecommunication Standardization Sector of ITU, ITU-T H.266, 2020, Part 1, p. 1-121.
Telecommunication Standardization Sector of ITU, ITU-T H.266, 2020, Part 2, p. 122-246.
Telecommunication Standardization Sector of ITU, ITU-T H.266, 2020, Part 3, p. 247-386.
Telecommunication Standardization Sector of ITU, ITU-T H.266, 2020, Part 4, p. 387-502.
Telecommunication Standardization Sector of ITU, ITU-T H.264, 2013, 731 pages.
Zeng, Feiyang et al., Non-CE4: Intra prediction mode of CHIP selection using left and above adjacent coded block, Joint Video Experts Team (JVET) of ITU-T SG 16 WP 3 and ISO/IEC JTC 1/SC 29/WG 11 6th Meeting, 2019, 2 pages.

* cited by examiner

SYSTEMS AND METHODS FOR IMAGE PREDICTION

CROSS-REFERENCE TO RELATED APPLICATIONS

This application is a Continuation of International Application No. PCT/CN2022/087831 filed on Apr. 20, 2022, which claims priority to Chinese Patent Application No. 202110700504.4, filed on Jun. 23, 2021, Chinese Patent Application No. 202110846640.4, filed on Jul. 26, 2021, the contents of each of which are incorporated herein by reference in their entirety.

TECHNICAL FIELD

The present disclosure generally relates to video coding technology, and in particular, to systems and methods for image prediction.

BACKGROUND

Video coding includes intra prediction, inter prediction, transformation, quantization, loop filter, entropy coding, etc., which may achieve the compression of video data. In the existing inter prediction, when matching blocks of a current block are constructed, a spatial correlation of adjacent blocks of the current block is not fully utilized, and a content correlation of image frames in a video is not fully considered, thereby affecting a compression rate of the video coding. In addition, the video coding may be implemented by combined inter and intra combination prediction (CIIP). However, the accuracy of the existing CIIP is not high, which reduces the compression rate of the video coding.

Therefore, it is desirable to provide systems and methods for image prediction, which may improve the accuracy of the CIIP, thereby improving the compression rate of the video coding.

SUMMARY

According to an aspect of the present disclosure, a method for image prediction in video processing is provided. The method may include obtaining a target block that has been predicted in an image frame. The method may also include determining, from the target block, one or more target regions to be compensated. The one or more target regions may be adjacent to at least one boundary of the target block. Each of the one or more target regions may have a predictive value. The method may further include, for a target region of the one or more target regions, determining an updated predictive value of the target region based on the predictive value of the target region and pixel values of pixels in a reference region corresponding to the target region.

In some embodiments, the one or more target regions may include a compensation region located at an upper left corner of the target block and adjacent to a first boundary and a second boundary of the target block, the first boundary and the second boundary of the target block being perpendicular to each other.

In some embodiments, the reference region corresponding to the compensation region may include at least one column of pixels located outside the target block and close to the first boundary of the target block and at least one row of pixels located outside the target block and close the second boundary of the target block.

In some embodiments, for the target region of the one or more target regions, the determining the updated predictive value of the target region based on the predictive value of the target region and the pixel values of the pixels in the reference region corresponding to the target region may include determining the updated predictive value of the target region by performing, based on first weights, a weighted averaging operation on the predictive value of the target region and the pixel values of the pixels in the reference region corresponding to the target region.

In some embodiments, the determining the updated predictive value of the target region by performing, based on the first weights, the weighted averaging operation on the predictive value of the target region and the pixel values of the pixels in the reference region corresponding to the target region may include determining a weighted value of pixel values of the pixels in the reference region corresponding to the target region by performing, based on second weights, a weighted averaging operation on the pixel values of the pixels in the reference region corresponding to the target region; and determining the updated predictive value of the target region by performing, based on the first weights, the weighted averaging operation on the predictive value of the target region and the weighted value of the pixel values of the pixels in the reference region corresponding to the target region.

In some embodiments, the determining, from the target block, the one or more target regions to be compensated may include obtaining, from the target block, a plurality of candidate regions with different sizes. For each of the plurality of candidate regions, an updated predictive value of the candidate region may be determined, and a cost corresponding to the candidate region may be determined based on the updated predictive value of the candidate region. Costs corresponding to the plurality of candidate regions may be compared, and from the plurality of candidate regions, a candidate region with a smallest cost may be designated as the target region.

In some embodiments, the method may further include determining an updated predictive value of the target block by performing, based on third weights, a weighted averaging operation on a predictive value of the target block and pixel values of pixels in a reference region corresponding to the target block; and updating the updated predictive value of the target region by performing, based on fourth weights, a weighted averaging operation on the updated predictive value of the target block and the updated predictive value of the target region.

In some embodiments, the predictive value of the target region includes an intra predictive value and an inter predictive value. The updated predictive value of the target region may be determined based on a combined inter and intra combination prediction technique, including obtaining an updated intra predictive value of the target region by correcting the intra predictive value of the target region based on the reference region, determining a target motion vector based on a current motion vector of the target block and a plurality of motion offsets, determining an updated intre predictive value of the target region based on the target motion vector, and determining the updated prective value of the target region based on the updated intra predictive value of the target region and the updated intre predictive value of the target region.

In some embodiments, the obtaining an intra predictive value of the target region by correcting an initial intra predictive value of the target region based on the reference region may include determining the intra predictive value of the target region by correcting the initial intra predictive value of the target region based on pixel values of the reference region and weights of the pixel values of the reference region.

In some embodiments, a size of the each of the one or more target regions may be determined based on a size of the target block.

In some embodiments, the determining a target motion vector by correcting a current motion vector of the target block using a plurality of motion offsets may include determining a plurality of candidate motion vectors by correcting the current motion vector of a current block using a plurality of motion offsets, and selecting, from the plurality of candidate motion vectors, a candidate motion vector corresponding to a smallest predicted cost as the target motion vector.

According to an aspect of the present disclosure, a system for image prediction in video processing is provided. The system may include at least one storage device storing executable instructions, and at least one processor in communication with the at least one storage device. When executing the executable instructions, the at least one processor may cause the system to perform a method. The method may include obtaining a target block that has been predicted in an image frame. The method may also include determining, from the target block, one or more target regions to be compensated. The one or more target regions may be adjacent to at least one boundary of the target block. Each of the one or more target regions may have a predictive value. The method may further include, for a target region of the one or more target regions, determining an updated predictive value of the target region based on the predictive value of the target region and pixel values of pixels in a reference region corresponding to the target region.

According to an aspect of the present disclosure, a non-transitory computer readable medium is provided. The non-transitory computer readable medium may include a set of instructions. When executing the executable instructions, at least one processor may cause a system to perform a method. The method may include obtaining a target block that has been predicted in an image frame. The method may also include determining, from the target block, one or more target regions to be compensated. The one or more target regions may be adjacent to at least one boundary of the target block. Each of the one or more target regions may have a predictive value. The method may further include, for a target region of the one or more target regions, determining an updated predictive value of the target region based on the predictive value of the target region and pixel values of pixels in a reference region corresponding to the target region.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It should be understood that the term "encoding unit," "current block," "encoding block," or "block," used herein refer to a basic unit of image processing or a specific position in an image and are used interchangeably. In addition, in the description of the present disclosure, the term "unit" includes all concepts of encoding unit, prediction unit, and transformation unit.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

In addition, it should be understood that in the description of the present disclosure, the terms "first", "second", or the like, are only used for the purpose of differentiation, and cannot be interpreted as indicating or implying relative importance, nor can be understood as indicating or implying the order.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

Figure 1:
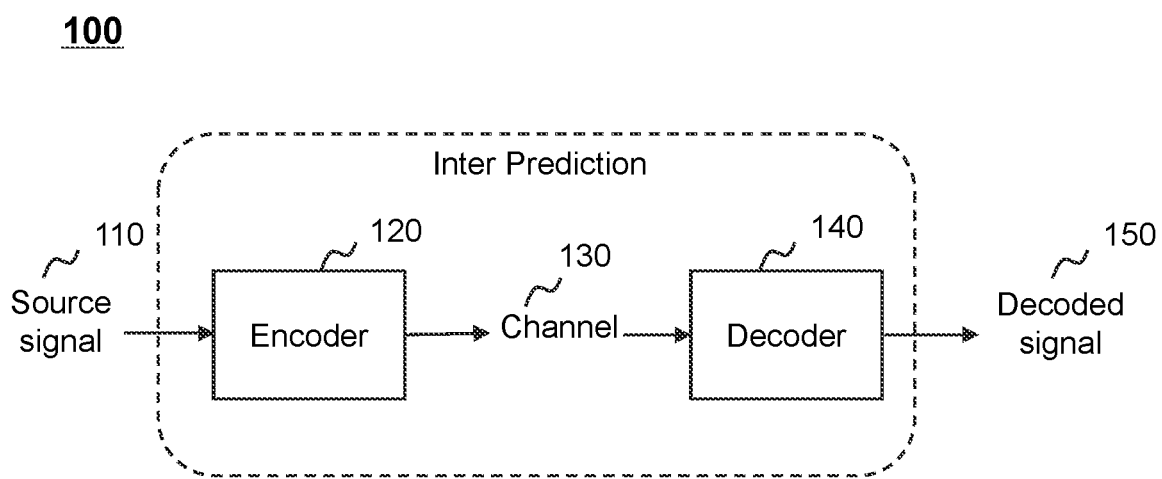
FIG. 1 is a schematic diagram illustrating an exemplary video processing system according to some embodiments of the present disclosure.

FIG. 1 is a schematic diagram illustrating an exemplary video processing system according to some embodiments of the present disclosure.

In some embodiments, a video processing system 100 may be applied to a video compression system, such as an air television broadcasting system, a cable television transmission system, a satellite television transmission system, an Internet video transmission system, a digital video stored in media, or the like. As used herein, video compression refers to a process of reducing the amount of data required to present a video. The purpose of the video compression may be to reduce redundant information in the video data so as to store and transmit the video data effectively.

As shown in FIG. 1, the video processing system 100 may include a source signal 110, an encoder 120, a channel 130, a decoder 140, and a decoded signal 150.

In some embodiments, the source signal 110 may refer to a video signal (also referred to as a video source or a video source signal). In some embodiments, the video source signal may refer to uncompressed dynamic images, for example, dynamic images in a digital video format.

In some embodiments, the encoder 120 may refer to a signal compression standard completed by software and/or hardware applications. The encoder 120 may be configured to compress the video source signal at a sending end to obtain an encoded video source signal (i.e., an encoded source signal).

In some embodiments, the decoder 140 may refer to a signal compression standard completed by software or hardware applications. The decoder 140 may be configured to generate an approximation of the video source signal in a decoding end for playback.

In some embodiments, the encoder 120 may perform transformation and quantization operations on residual information of the video source signal generated by intra prediction. The residual information may be encoded through entropy coding and transmitted to the decoding end. The decoder 140 may extract the residual information from information transmitted from the encoder 120, and further determine a reconstructed value of the video source signal by combining a predicted value obtained by motion estimation.

In some embodiments, the channel 130 may transmit or store encoded video data (e.g., the compressed/encoded video source signal). The channel 130 may include a wireless channel, a wired channel, or a frequency band. The channel 130 may include a twisted pair, a cable, an optical fiber, or a medium that may propagate electromagnetic waves.

In some embodiments, the decoded signal 150 may refer to data (i.e., video data after being compressed and decompressed) reconstructed from the source signal 110 after being encoded and decoded.

In some embodiments, the encoded video data (e.g., the compressed/encoded video source signal) may be stored in a storage device (e.g., a hard disk), and the encoded video data may be read from the storage device during a subsequent decoding processing process.

In some embodiments, the video processing system 100 may further include a channel encoder. The channel encoder may refer to a device or program that may further encode the encoded video source signal before channel transmission at the sending end. The channel encoder may be configured to perform an error correction. In some embodiments, the video processing system 100 may further include a channel decoder. The channel decoder may be configured at a receiving end to detect and correct an error in data transmission. The encoded video source signal may be unzipped by the channel decoder.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 2:
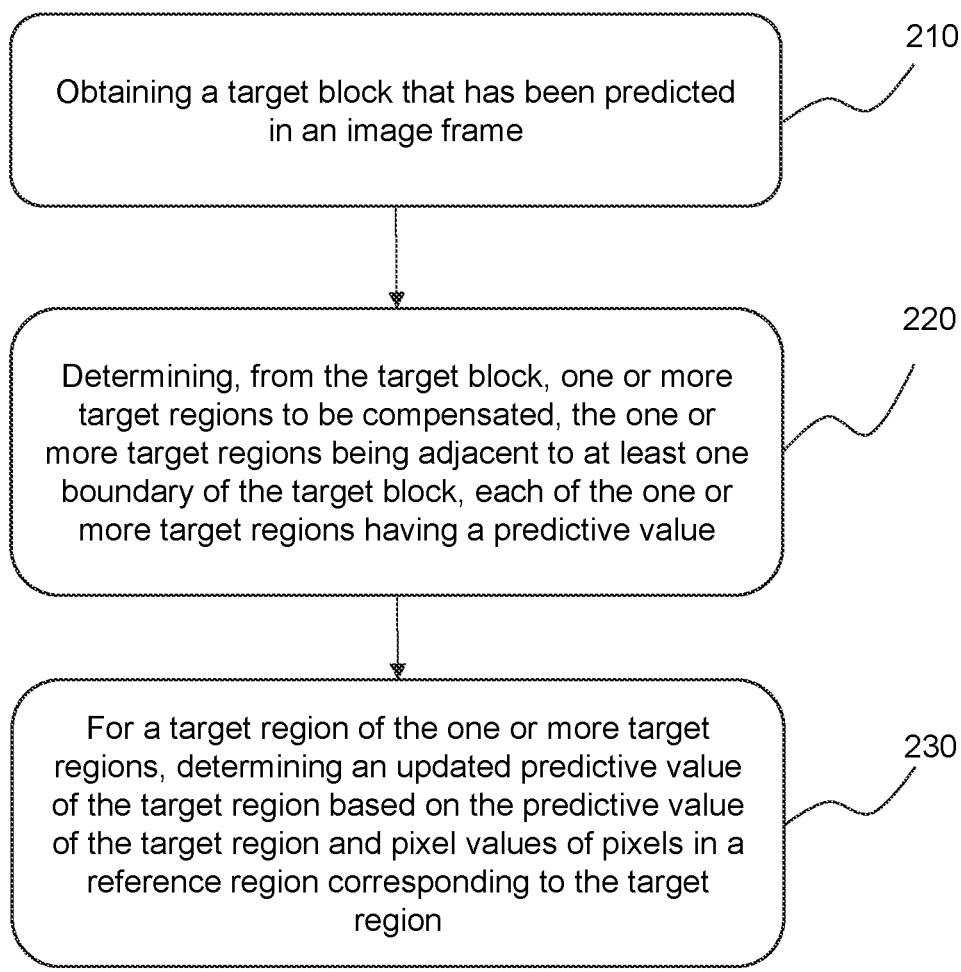
FIG. 2 is a flowchart illustrating an exemplary process for image prediction according to some embodiments of the present disclosure.

FIG. 2 is a flowchart illustrating an exemplary process for image prediction according to some embodiments of the present disclosure. In some embodiments, the process 200 may be implemented by a video processing system (e.g., the video processing system 100 illustrated in FIG. 1, a video processing system 600 illustrated in FIG. 6). In some embodiments, the video processing system may be implemented by software and/or hardware, and/or may be integrated into a video processing device (e.g., a video processing device 700 illustrated in FIG. 7) that includes a processing device (e.g., a processing device 710). In some embodiments, at least part of process 200 may be performed by the processing device including at least one processor and a storage device (e.g., a storage 720). For example, the process 200 may be stored in the storage device in the form of instructions (e.g., an application), and invoked and/or executed by the processing device. The operations of the illustrated process presented below are intended to be illustrative. In some embodiments, the process 200 may be accomplished with one or more additional operations not described, and/or without one or more of the operations discussed. Additionally, the order in which the operations of the process 200 as illustrated in FIG. 2 and described below is not intended to be limiting.

In 210, a target block that has been predicted in an image frame may be obtained. In some embodiments, the operation 210 may be performed through an obtaining module 610.

The target block may correspond to a current block. The target block may be determined based on the current block. The current block may refer to a block that needs to be predicted in the image frame and corresponds to the target block. After being predicted, the current block may be designated as the target block. In some embodiments, a plurality of candidate motion vectors may be determined by correcting a current motion vector of the current block using a plurality of motion offsets. A candidate motion vector with a smallest predicted cost may be selected from the plurality of candidate motion vectors as a target motion vector. Further, the target block may be determined based on the target motion vector. For example, the target block may be a block pointed by the target motion vector.

The current motion vector of the current block may be a motion vector of the current block obtained during the inter prediction. For example, the current motion vector of the current block may be any one motion vector in a list of motion vectors constructed based on inter prediction that is under a Merge mode. In some embodiments, the current motion vector of the current block may be a motion vector of the current block obtained based on a combined inter and intra prediction (CIIP).

In some embodiments, a motion offset may be a preset vector that is configured to correct the current motion vector of the current block. In some embodiments, the motion offset may be determined before the prediction of the current block, or set according to actual needs during the prediction of the current block.

In some embodiments, each of the plurality of candidate motion vectors may be determined by combining the current motion vector of the current block with one of the plurality of motion offsets. For example, when the current motion vector of the current block is the motion vector of the current block obtained during the inter prediction, each of the plurality of candidate motion vectors may be determined by combining one of the plurality of motion offsets with the motion vector of the current block obtained during the inter prediction. As another example, when the current motion vector of the current block is the motion vector of the current block obtained based on the CIIP, each of the plurality of candidate motion vectors may be determined by combining one of the plurality of motion offsets with the motion vector of the current block obtained based on the CIIP.

In some embodiments, after the plurality of candidate motion vectors is determined, the inter prediction may be performed on the current block based on the plurality of candidate motion vectors to obtain a predicted cost corresponding to each candidate motion vector of the plurality of candidate motion vectors. Further, the candidate target motion vector corresponding to the smallest predicted cost may be determined from the plurality of candidate target motion vector as the target motion vector of the current block.

In some embodiments, a motion offset may include an offset amplitude and an offset direction. The offset amplitude and the offset direction of the motion offset may be predetermined. The offset amplitude may be used to correct a value of the current motion vector of the current block. The offset amplitude may be denoted as a count of pixels for offset. The offset direction may be used to correct a direction of the current motion vector of the current block. For example, the offset direction may be an upward direction, and the offset amplitude may be one pixel, that is, the motion offset including the offset direction and the offset amplitude may be a vector that is one pixel in size and points upward.

In some embodiments, the plurality of motion offsets may be obtained by combining the predetermined offset amplitudes and the predetermined offset directions with each other. For example, if a count of the predetermined offset directions is 4 and a count of the predetermined offset amplitude is 8, 32 motion offsets may be obtained by combining the 4 offset directions and the 8 offset amplitudes with each other.

In some embodiments, a video frame may include a forward reference frame and/or a backward reference frame. For the video frame (i.e., an image frame) only including the forward reference frame or the backward reference frame, each of the plurality of candidate motion vectors obtained based on the plurality of motion offsets may be a relative displacement of the current block relative to an optimal matching block of the reference frame. The motion offsets may be motion offsets of a motion vector of the current block relative to the optimal matching block of the reference frame.

In some embodiments, the image frame including the current block may include a forward reference frame and a backward reference frame, that is, the image frame may include the two reference frames in different directions. In such cases, the motion offsets of the current motion vector of the current block may include forward motion offsets and backward motion offsets. A first distance between the image frame and the forward reference frame and a second distance between the image frame and the backward reference frame may be determined. A distance (e.g., the first distance, the second distance) between the image frame and a reference frame (e.g., the forward reference frame, the backward reference frame) may be an absolute value of a difference between a play number of the image frame and a play number of the reference frame. For example, if the play number of the image frame is 5 and the play number of the forward reference frame is 1, the first distance between the image frame and the forward reference frame is 4. If the play number of the backward reference frame is 10, the second distance between the image frame and the backward reference frame is 5.

A forward motion offset and a backward motion offset may be determined based on the first distance, the second distance, a predetermined offset amplitude, and a predetermined offset direction. For example, when the first distance is equal to the second distance (that is, the distance between the image frame and the forward reference frame is equal to the distance between the image frame and the backward reference frame), the forward motion offset may be equal to the backward motion offset, and the forward motion offset or the backward motion offset may be determined based on the predetermined offset amplitude and the predetermined offset direction.

As another example, when the first distance is greater than the second distance (that is, the distance between the image frame and the forward reference frame is greater than the distance between the image frame and the backward reference frame), the forward motion offset may be determined based on the predetermined offset amplitude and the predetermined offset direction, and then the backward motion offset may be determined based on the forward motion offset, the first distance, and the second distance. Specifically, the backward motion offset may be determined based on the following equation (1):

$$MVD1 = \left(\frac{currPocDiffL1}{currPocDiffL0}\right) * MVD0, \quad (1)$$

where MVD1 refers to the backward motion offset, MVD0 refers to the forward motion offset, currPocDiffL1 refers to the second distance, and currPocDiffL0 refers to the first distance.

For a further example, when the second distance is greater than the first distance (that is, the distance between the image frame and the backward reference frame is greater than the distance between the image frame and the forward reference frame), the backward motion offset may be determined based on the predetermined offset amplitude and the predetermined offset direction, and then the forward motion offset may be determined based on the backward motion offset, the first distance, and the second distance. Specifically, the forward motion offset may be determined based on the following equation (2):

$$MVD0 = \left(\frac{currPocDiffL0}{currPocDiffL1}\right) * MVD1, \qquad (2)$$

where MVD1 refers to the backward motion offset, MVD0 refers to the forward motion offset, currPocDiffL1 refers to the second distance, and currPocDiffL0 refers to the first distance.

In some embodiments, after the forward motion offsets and the backward motion offsets are obtained, forward candidate motion vectors may be obtained by correcting a forward current motion vector of the current block using the forward motion offsets, and backward candidate motion vectors may be obtained by correcting a backward current motion vector of the current block using the backward motion offsets. Further, a forward candidate motion vector corresponding to the smallest predicted cost may be selected from the forward candidate motion vectors as a target forward motion vector, and a backward candidate motion vector corresponding to the smallest predicted cost may be selected from the backward candidate motion vectors as a target backward motion vector.

According to the above embodiments in the present disclosure, the motion offsets may be obtained based on the predetermined offset amplitudes and the predetermined offset directions, and the plurality of candidate motion vectors may be determined by correcting the current motion vector of the current block using the motion offsets, which may achieve the correction of the current motion vector of the current block and improve the accuracy of the plurality of candidate motion vectors of the current block.

Further, the candidate motion vector corresponding to the smallest predicted cost may be selected from the plurality of candidate motion vectors as the target motion vector, which may achieve the further correction of the current motion vector of the current block, thereby improving the accuracy of the target motion vector of the current block and the compression rate of the video coding.

In 220, one or more target regions to be compensated may be determined from the target block. In some embodiments, the operation 220 may be performed through a first determination module 620. In some embodiments, the one or more target regions may be adjacent to at least one boundary of the target block.

In some embodiments, each of the one or more target regions may have a predictive value (also referred to as an original predictive value). The target region may refer to a region in the target block whose original predictive value needs to be adjusted (or compensated).

In some embodiments, the one or more target regions may include a compensation region (also referred to as an upper left compensation region) located at an upper left corner of the target block and adjacent to a first boundary and a second boundary of the target block. The first boundary (e.g., a left boundary) and the second boundary (e.g., an upper boundary) of the target block may be perpendicular to each other. In other words, a first side of the upper left compensation region may be a portion of the first boundary, a second side of the upper left compensation region may be a portion of the second boundary, and the first side may be connected with the second side. In some embodiments, the one or more target regions may include a compensation region (also referred to as an upper compensation region) located at an upper part of the target block and adjacent to the second boundary of the target block. In other words, a first side of the upper compensation region may coincide with a portion of the second boundary, a second side of the left compensation region may coincide with a portion of the third boundary parallel to the first boundary, and the first side may be connected with the second side. In some embodiments, the one or more target regions may include a compensation region (also referred to as a left compensation region) located at a left part of the target block and adjacent to the first boundary of the target block. In other words, a first side of the left compensation region may coincide with a portion of the first boundary, a second side of the left compensation region may coincide with a portion of the fourth boundary parallel to the second boundary, and the first side may be connected with the second side. In some embodiments, a shape of each compensation region included in the one or more target regions may be rectangular. In some embodiments, heights or widths of compensation regions included in the one or more target regions may be equal or not equal. More descriptions regarding the compensation region may be found elsewhere in the present disclosure, for example, FIGS. 3-5 and relevant descriptions thereof.

In some embodiments, a plurality of candidate regions with different sizes (e.g., heights and widths) may be obtained from the target block. For each of the plurality of candidate regions, an updated predictive value of the candidate region may be determined by compensating the each of the plurality of candidate regions. A cost corresponding to the candidate region may be determined based on the updated predictive value of the candidate region. Further, costs corresponding to the plurality of candidate regions may be compared, and a candidate region with a smallest cost may be designated, from the plurality of candidate regions, as the target region. More descriptions regarding the obtaining of the updated predictive value may be found elsewhere in the present disclosure, for example, operation 230 in FIG. 2 and relevant descriptions thereof.

In some embodiments, a size of each of the one or more target regions may be determined based on a size of the target block. In some embodiments, for a target region of the one or more target regions in the target block, a region with a distance from a reference region may be the target region. The distance between may be set based on the size of the target block, so that the distance may be adapted to the size of the target block, and the setting of the distance may be more reasonable. More descriptions for the reference region may be found elsewhere in the present disclosure (e.g., operation 230). In some embodiments, the distance may be determined based on equation (3):

$$\begin{cases} \text{scale} = ((\text{Log[width]} - 2 + \text{Log[height]} - 2 + 2) \gg 2) \\ \text{x\_max} = (6 \ll \text{scale}) \gg 1 \\ \text{y\_max} = (6 \ll \text{scale}) \gg 1 \end{cases} \qquad (3)$$

where operation relations involved in equation (3) are operation relations in C program language, width refers to a width of the target block, height refers to a height of the target block, scale refers to an intermediate value, and x_max refers to a distance between pixels in a reference region close to the first boundary the target block and the target region, and y_max refers to a distance between pixels in a reference region close to the second boundary the target block and the target region right of the target block.

In 230, for a target region of the one or more target regions, an updated predictive value of the target region may be determined based on the predictive value of the target region and pixel values of pixels in a reference region corresponding to the target region. In some embodiments, the operation 230 may be performed through a second determination module 630.

In some embodiments, the predictive value of the target region may refer to an original predictive value of pixels (also referred to as an initial predictive value) in the target region obtained by the prediction or but not yet corrected (compensated). For example, the predictive value of the target region may be obtained by a Planar intra prediction mode. The predictive value of the target region may include an intra predictive value and an inter predictive value. In some embodiments, the intra predictive value of the target region may refer to an original predictive value of pixels (also referred to as an initial intra predictive value) in the target region obtained by an intra prediction technique or but not yet corrected (compensated). In some embodiments, the inter predictive value of the target region may refer to an original predictive value of pixels (also referred to as an initial inter predictive value) in the target region obtained by an inter prediction technique or but not yet corrected (compensated).

In some embodiments, the updated predictive value (also referred to as predictive value) of the target region may be determined by compensating (or correcting) the initial predictive value of the target region. For example, the updated predictive value of the target region may be determined by compensating (or correcting) the predictive value of the target region using the pixel values of the pixels in the reference region corresponding to the target region. In some embodiments, the updated predictive value of the target region may be determined based on the intra predictive value and the inter predictive value of the target region. For example, an updated intra predictive value of the target region may be obtained by correcting the intra predictive value of the target region based on the reference region. A target motion vector may be determined by correcting a current motion vector of the target block using a plurality of motion offsets. An updated intre predictive value of the target region may be determined based on the target motion vector; and the updated prective value of the target region may be determined based on the updated intra predictive value of the target region and the updated intre predictive value of the target region.

In some embodiments, the reference region corresponding to the target region may refer to an image region that is located outside the target block and has been reconstructed. In some embodiments, the reference region may include a first reference region and/or a second reference region. The first reference region may be located outside the target block and close to the first boundary of the target block. The first reference region may include at least one column of pixels (also referred to as first pixels) close to the first boundary of the target block. The second reference region may be located outside the target block and close to the second boundary of the target block. The second reference region may include at least one row of pixels (also referred to as second pixels) close to the second boundary of the target block.

In some embodiments, for the left compensation region, the reference region may include the first reference region. In some embodiments, for the upper compensation region, the reference region may include the second reference region. In some embodiments, for the upper left compensation region, the reference region may include the first reference region and the second reference region.

In some embodiments, for the left compensation region, the first reference region may also include at least one pixel adjacent to two sides of the first pixels. In some embodiments, for the upper compensation region, the second reference region may also include at least one pixel adjacent to two sides of the second pixels. In some embodiments, for the upper left compensation region, the first reference region may also include the at least one pixel adjacent to the two sides of the first pixels, and the second reference region may also include the at least one pixel adjacent to the two sides of the second pixels. More descriptions regarding the reference region may be found elsewhere in the present disclosure, for example, FIGS. 3-5 and relevant descriptions thereof.

In some embodiments, the updated predictive value of the target region may be determined by performing, based on first weights, a weighted averaging operation on the predictive value of the target region and the pixel values of the pixels in the reference region corresponding to the target region.

In some embodiments, the pixel values of the pixels in the reference region corresponding to the target region may include first pixel values and/or second pixel values. In some embodiments, the first pixel values may include pixel values of the first pixels, and the second pixel values may include pixel values of the second pixels. In some embodiments, the first pixel values may include pixel values of the first pixels and the at least one pixel adjacent to two sides of the first pixels, and the second pixel values may include pixel values of the second pixels and the at least one pixel adjacent to two sides of the second pixels.

In some embodiments, the updated predictive value of the target region may be determined by performing, based on the first weights, the weighted averaging operation on the predictive value of the target region, the first pixel values, and the second pixel values.

In some embodiments, a preprocessing operation may be performed on the first pixel values and/or the second pixel values to obtain processed first pixel values and/or processed second pixel values. In some embodiments, the preprocessing operation may include a filtering operation. For example, the filtering operation may be performed on the first pixel values and the second pixel values by using a filter. Merely by way of example, a parameter of the filter may be [1, 4, 1] or [1, 5, 1]. In some embodiments, the parameter of the filter may not be limited. The filter may adjust the first pixel values and/or the second pixel values based on pixel values of adjacent pixels of the pixels, in the target region. Specifically, vertical sliding window processing may be performed on the first pixel values by the filter, and/or horizontal sliding window processing may be performed on the second pixel values by the filter. For example, assuming that the parameter of the filter is [1, 4, 1], for a specific pixel in the target region, a first pixel value of a pixel in the first reference region corresponding to the specific pixel is 80, a pixel value of an adjacent pixel located at an upper side of the specific pixel is 50, and a pixel value of an adjacent pixel located at an underside of the specific pixel is 60, the processed pixel value of the first pixel value by the filter may be (80*4+60*1+40*1)/6=70. For the specific pixel in the target region, a second pixel value of a pixel in the second reference region corresponding to the specific pixel is 80, a pixel value of an adjacent pixel located at a left side of the specific pixel is 50, and a pixel value of an adjacent pixel located at a right side of the specific pixel is 60, the processed pixel value of the second pixel value by the filter may be (80*4+60*1+40*1)/6=70.

In some embodiments, the updated predictive value of the target region may be determined by compensating the target region based on the processed first pixel values and/or the processed second pixel values. For example, for the left compensation region, the updated predictive value of the left compensation region may be determined by compensating the left compensation region based on the processed first pixel values. As another example, for the upper compensation region, the updated predictive value of the upper compensation region may be determined by compensating the upper compensation region based on the processed second pixel values. For a further example, for the upper left compensation region, the updated predictive value of the upper left compensation region may be determined by compensating the upper left compensation region based on the processed first pixel values and/or the processed second pixel values.

According to the above embodiments in the present disclosure, the compensating of the target region may increase the correlation between the target region and the pixels in the first reference region and/or the second reference region, thereby improving the accuracy of the updated predictive value of the target region.

In some embodiments, a weighted value of pixel values (e.g., the first pixel values, the second pixel values) of the pixels (e.g., the first pixels, the second pixels, the at least one pixel adjacent to two sides of the first pixels, the at least one pixel adjacent to two sides of the second pixels) in the reference region corresponding to the target region may be determined by performing, based on second weights, a weighted averaging operation on the pixel values of the pixels in the reference region corresponding to the target region. Accordingly, the weighted value may include a first weighted value corresponding to the first pixel values and/or a second weighted value corresponding to the second pixel values.

In some embodiments, the second weights may be preset. The first weighted value may be determined by performing, based on the second weights, the weighted averaging operation on the first pixel values. The second weighted value may be determined by performing, based on the second weights, the weighted averaging operation on the second pixel values.

A second weight corresponding to a pixel value of a pixel in the reference region may be determined based on a distance between the pixel in the reference region and the target region. The smaller the distance between the pixel in the reference region and the target region is, the stronger the correlation between the pixel in the reference region and pixels in the target region is, and the greater the second weight corresponding to the pixel value of the pixel in the reference region may be. The larger the distance between the pixel in the reference region and the target region is, the weaker the correlation between the pixel in the reference region and the pixels in the target region is, and the smaller the second weight corresponding to the pixel value of the pixel in the reference region may be. In some embodiments, a sum of normalized second weights corresponding to the pixel values of the pixels in the reference region is 1.

After the weighted value of the pixel values of the pixels in the reference region corresponding to the target region are determined, the updated predictive value of the target region may be determined by performing, based on the first weights, the weighted averaging operation on the predictive value of the target region and the weighted value of the pixel values of the pixels in the reference region corresponding to the target region. More descriptions regarding the determining of the updated predictive value of the target region may be found elsewhere in the present disclosure, for example, FIG. 3 and relevant descriptions thereof.

According to the above embodiments in the present disclosure, the weighted value of the pixel values of the pixels in the reference region corresponding to the target region is determined by performing the weighted averaging operation on the pixel values of the pixels in the reference region corresponding to the target region, and then the updated predictive value of the target region is determined by performing the weighted averaging operation on the predictive value of the target region and the weighted value of the pixel values of the pixels in the reference region corresponding to the target region, thereby improving the accuracy of the updated predictive value of the target region.

In some embodiments, the updated predictive value of the target block may be determined by performing, based on third weights, a weighted averaging operation on the predictive value of the target block and the pixel values of pixels in the reference region corresponding to the target block. The updated predictive value of the target region may be updated by performing, based on fourth weights, a weighted averaging operation on the updated predictive value of the target block and the updated predictive value of the target region. The third weights and the fourth weights may be set according to experience, which may not be limited herein.

In some embodiments, the target block may be encoded based on the updated predictive value of the region and the predictive value of the target block to obtain a code stream of the target block.

In some embodiments, a syntax element may be set to indicate the encoding of the target block mentioned above. For example, a syntax element may be set to indicate how the reference region (e.g., the first reference region and/or the second reference region) corresponding to the target region is determined. As another example, a syntax element may be set to indicate how to determine the one or more target regions, e.g., the upper left compensation region, the upper compensation region the left compensation region. For a further example, a syntax element may be set to indicate which of multiple sets of preset weights (e.g., the first weights, the second weights, the third weights, the fourth weights) is selected.

In some embodiments, a first switch may be added to the syntax element of the target block. The first switch may indicate whether the updated predictive value of the target region may be used by the target block. If the first switch is on, the updated predictive value of the target region may be used by the target block. If the first switch is off, the updated predictive value of the target region may not be used by the target block. In some embodiments, if the first switch is on, a first identifier may be added to the syntax element of the target block to indicate whether the updated predictive value of the target region is obtained based on the predictive value of the target region.

In some embodiments, a second switch may be added to the syntax element of the target block. The second switch may indicate whether the current motion vector of the target block may be corrected based on the motion offsets during obtaining the target motion vector of the target block. If the second switch is on, the current motion vector of the target block may be corrected based on the motion offsets during obtaining the target motion vector of the target block. If the second switch is off, the current motion vector of the target block may not be corrected based on the motion offsets during obtaining the target motion vector of the target block. In some embodiments, if the second switch is on, a second identifier may be added to the syntax element of the target block to indicate whether the current motion vector of the target block is corrected based on the motion offsets during obtaining the target motion vector of the target block. In some embodiments, if the current motion vector of the target block is corrected based on the motion offsets during obtaining the target motion vector of the target block, a first index and a second index may be further added to the syntax element of the target block to indicate the offset amplitudes and the offset directions of the motion offsets. For example, the first index may indicate the offset amplitudes of the motion offsets, and the second index may indicate the offset directions of the motion offsets.

According to the above embodiments in the present disclosure, for a target region of the one or more target regions in the target block, the updated predictive value of the target region may be determined based on the predictive value of the target region and the pixel values of the pixels in the reference region corresponding to the target region, which involves the correlation between the pixels in the reference region corresponding to the target region and the pixels in the target region, thereby improving the accuracy of the updated predictive value of the target region, reducing the residual value, and improving the performance of the interframe coding.

Figure 3:
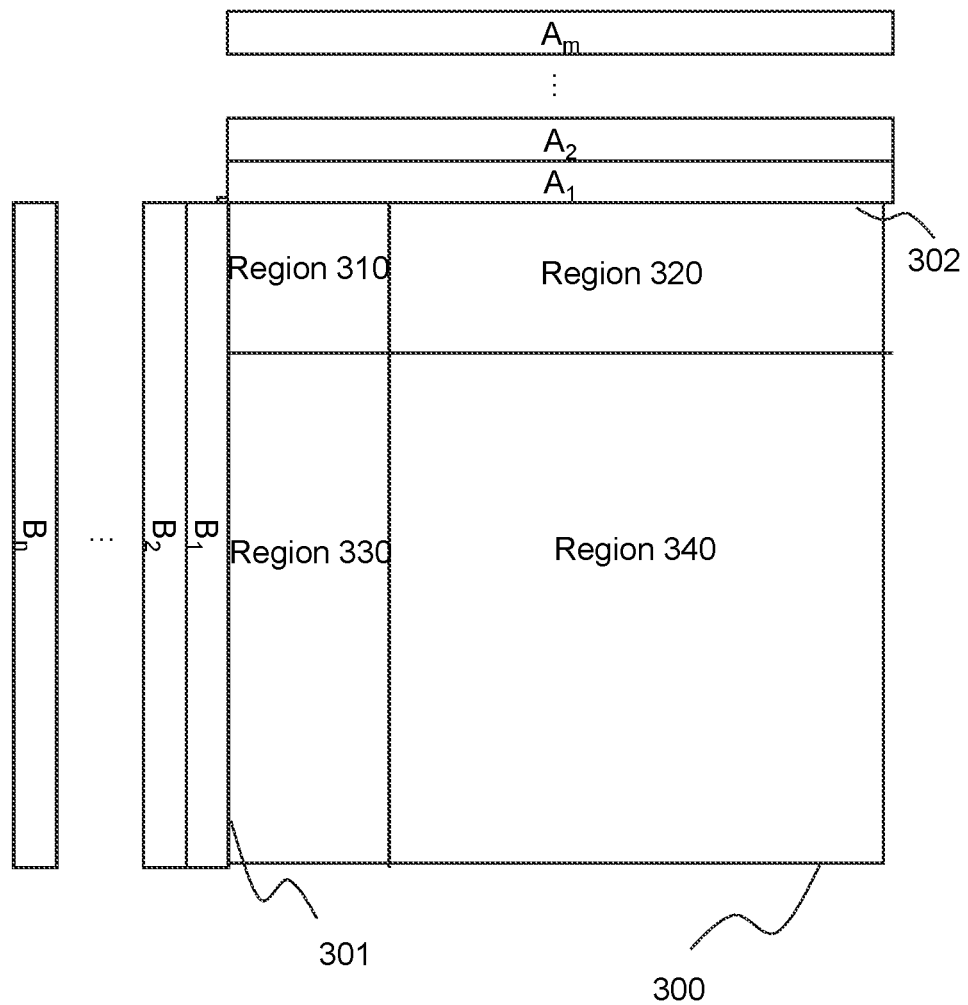
FIG. 3 is a schematic diagram illustrating exemplary target regions and a reference region according to some embodiments of the present disclosure.

FIG. 3 is a schematic diagram illustrating exemplary compensation regions and a reference region according to some embodiments of the present disclosure. As shown in FIG. 3, a target block 300 may be divided into 4 regions including a region 310, a region 320, a region 330, and a region 340. The region 310 located at an upper left corner of the target block 300 may be the upper left compensation region. The region 320 located at an upper part of the target block 300 may be the upper compensation region. The region 330 located at a left part of the target block 300 may be the left compensation region.

As described in connection with FIG. 2, the heights or widths of the compensation regions included in the one or more target regions may be equal or not equal. For example, a height of the upper left compensation region (i.e., the region 310) in FIG. 3 may be equal to a height of the upper compensation region (i.e., the region 320) in FIG. 3, and a width of the upper left compensation region (i.e., the region 310) in FIG. 3 may not be equal to a width of the upper compensation region (i.e., the region 320) in FIG. 3. As another example, the height of the upper left compensation region (i.e., the region 310) in FIG. 3 may not be equal to a height of the left compensation region (i.e., the region 330) in FIG. 3, and the width of the upper left compensation region (i.e., the region 310) in FIG. 3 may be equal to a width of the left compensation region (i.e., the region 330) in FIG. 3. For a further example, the height of the upper compensation region (i.e., the region 320) in FIG. 3 may not be equal to the height of the left compensation region (i.e., the region 330) in FIG. 3, and the width of the upper compensation region (i.e., the region 320) in FIG. 3 may not be equal to the width of the left compensation region (i.e., the region 330) in FIG. 3.

As described in connection with FIG. 2, a reference region may include a first reference region and/or a second reference region. As shown in FIG. 3, the first reference region may be located outside the target block 300 and close to the first boundary 301 of the target block 300. The first reference region may include n column of pixels (e.g., $B_1$, $B_2$, ..., and $B_n$). The second reference region may be located outside the target block 300 and close to the second boundary 302 of the target block 300. The second reference region may include m row of pixels (e.g., $A_1$, $A_2$, ..., and $A_m$). The reference region of the upper left compensation region (i.e., the region 310) may include the first reference region and the second reference region. The reference region of the upper compensation region (i.e., the region 320) may include the second reference region. The reference region of the left compensation region (i.e., the region 330) may include the first reference region.

In some embodiments, assuming that a size of the target block 300 is 16×16 (that is, a width and height of the target block are 16 pixels respectively), a size of the upper left compensation region (i.e., the region 310) is 4×4 (that is, a width and height of the region 310 are 4 pixels respectively), a size of the upper compensation region (i.e., the region 320) is 12×4 (that is, a width and height of the region 320 are 12 pixels and 4 pixels respectively), a size of the left compensation region (i.e., the region 330) is 4×12 (that is, a width and height of the region 330 are 4 pixels and 12 pixels respectively), a size of the region 340 is 12×12 (that is, a width and height of the region 340 are 12 pixels respectively), and n=m=4 (that is, the first reference region includes 4 column of pixels $B_1$, $B_2$, $B_1$, and $B_1$, the second reference region includes 4 row of pixels $A_1$, $A_2$, $A_3$, and $A_4$), the updated predictive values of the upper left compensation region (i.e., the region 310), the upper compensation region (i.e., the region 320), and the left compensation region (i.e., the region 330) may be determined according to the following description.

A first weighted value of pixel values of the pixels in the first reference region may be determined according to equation (4):

$$PL_{weighting}(x,y) = \beta_1 * B_1(x-1,y) + \beta_2 * B_2(x-2,y) + \beta_3 * B_3(x-3,y) + \beta_4 * B_4(x-4,y), \quad (4)$$

where $PL_{weighting}(x,y)$ refers to the first weighted value, $B_1(x-1,y)$, $B_2(x-2,y)$, $B_3(x-3,y)$, and $B_4(x-4,y)$ refer to the pixel values of the pixels in the first reference region, and $\beta_1$, $\beta_2$, $\beta_3$, and $\beta_4$ refer to second weights corresponding to $B_1(x-1,y)$, $B_2(x-2,y)$, $B_3(x-3,y)$, and $B_4(x-4,y)$, respectively.

A second weighted value of pixel values of the pixels in the second reference region may be determined according to equation (5):

$$PT_{weighting}(x,y) = \alpha_1 * A_1(x,y-1) + \alpha_2 * A_2(x,y-2) + \alpha_3 * A_3(x,y-3) + \alpha_4 * A_4(x,y-4), \quad (5)$$

where $PT_{weighting}(x,y)$ refers to the second weighted value, $A_1(x,y-1)$, $A_2(x,y-2)$, $A_3(x,y-3)$, and $A_4(x,y-4)$ refer to the pixel values of the pixels in the second reference region, and $\alpha_1$, $\alpha_2$, $\alpha_3$, and $\alpha_4$ refer to second weights corresponding to $A_1(x,y-1)$, $A_2(x,y-2)$, $A_3(x,y-3)$, and $A_4(x,y-4)$, respectively.

An updated predictive value of the upper left compensation region (i.e., the region 310) may be determined according to equation (6):

$$P1_{weighting}(x,y) = \gamma_1 * PT_{weighting}(x,y) + \gamma_2 * PL_{weighting}(x,y) + \gamma_3 * P_{cur}(x,y), \quad (6)$$

where $P1_{weighting}(x,y)$ refers to the updated predictive value of the upper left compensation region (i.e., the region 310), $P_{cur}(x,y)$ refers to an original predictive value of the upper left compensation region (i.e., the region 310), $\gamma_1$, $\gamma_2$, and $\gamma_3$ refer to first weights corresponding to $PT_{weighting}(x,y)$, $PL_{weighting}(x,y)$ and $P_{cur}(x,y)$, respectively. In some embodiments, for the upper left compensation region (i.e., the region 310), a range of x is [0, 3], a range of y is [0, 3]. In some embodiments, $\alpha_1 = \beta_1$, $\alpha_2 = \beta_2$, $\alpha_3 = \beta_3$, $\alpha_4 = \beta_n$, $\alpha_1 + \alpha_2 + \alpha_3 + \alpha_4 = 1$, $\beta_1 + \beta_2 + \beta_3 + \beta_4 = 1$, $\gamma_1 = \gamma_2$, and $\gamma_1 + \gamma_2 + \gamma_3 = 1$. For example, $$\alpha_1 = \beta_1 = \frac{3}{8},$$

$$\alpha_2 = \beta_2 = \frac{5}{16},$$

$$\alpha_3 = \beta_3 = \frac{3}{16},$$

$$\alpha_4 = \beta_4 = \frac{1}{8},$$

$$\gamma_1 = \gamma_2 = \frac{1}{8},$$

$$\gamma_3 = \frac{3}{4}.$$

An updated predictive value of the upper compensation region (i.e., the region 320) may be determined according to equation (7):

$$P2_{weighting}(x,y) = \chi_1 * PT_{weighting}(x,y) + \chi_2 * P_{cur}(x,y), \quad (7)$$

where $P2_{weighting}(x,y)$ refers to the updated predictive value of the upper compensation region (i.e., the region 320), $\chi_1$ and $\chi_2$ refer to first weights corresponding to $PT_{weighting}(x,y)$ and $P_{cur}(x,y)$, respectively. In some embodiments, for the upper compensation region (i.e., the region 320), a range of x is [4, 15], a range of y is [0, 3]. In some embodiments, $\chi_1 + \chi_2 = 1$. For example, $$\chi_1 = \frac{1}{4},$$

$$\chi_2 = \frac{3}{4}.$$

An updated predictive value of the left compensation region (i.e., the region 330) may be determined according to equation (8):

$$P3_{weighting}(x,y) = \delta_1 * PL_{weighting}(x,y) + \delta_2 * P_{cur}(x,y), \quad (8)$$

where $P3_{weighting}(x,y)$ refers to the updated predictive value of the left compensation region (i.e., the region 330), $\delta_1$ and $\delta_2$ refer to first weights corresponding to $PL_{weighting}(x,y)$ and $P_{cur}(x,y)$ respectively. In some embodiments, for the left compensation region (i.e., the region 330), a range of x is [0, 3], a range of y is [4, 15]. In some embodiments, $\delta_1 + \delta_2 = 1$. For example, $$\delta_1 = \frac{1}{4},$$

$$\delta_2 = \frac{3}{4}.$$

Figure 4:
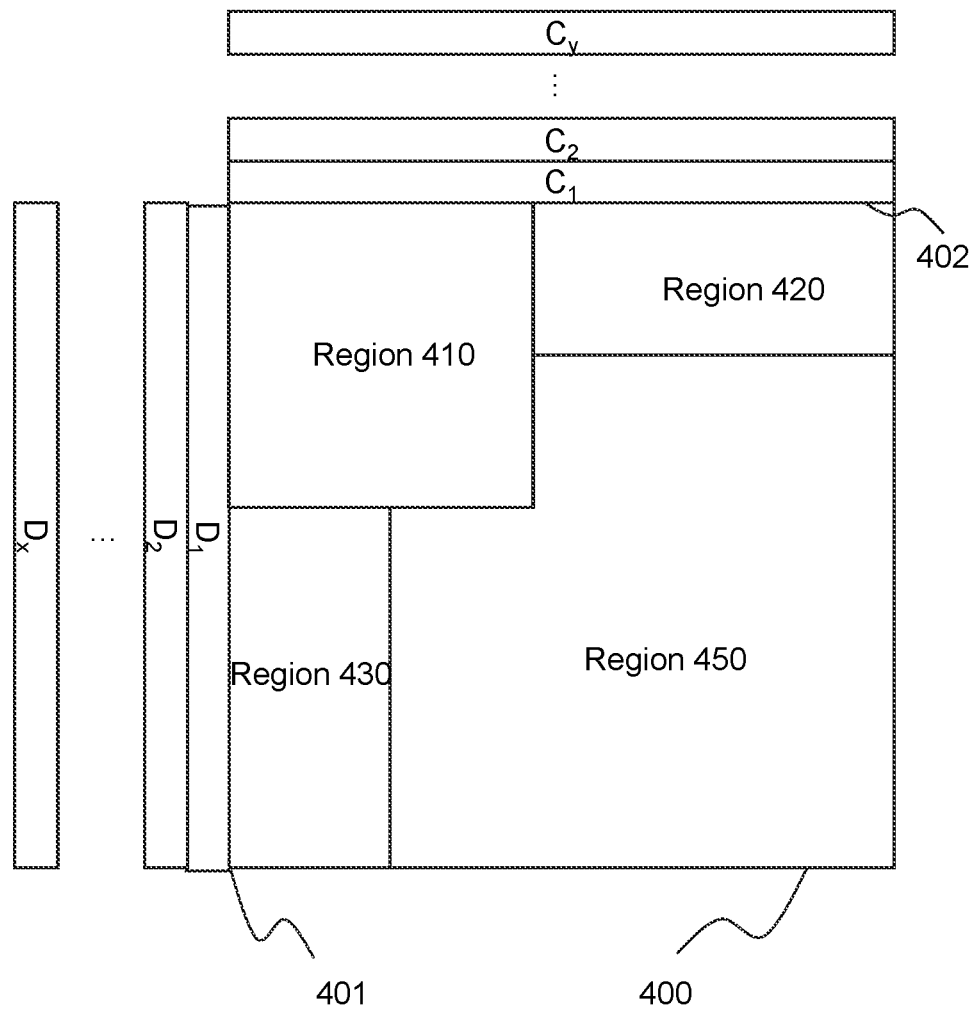
FIG. 4 is a schematic diagram illustrating exemplary target regions and a reference region according to some embodiments of the present disclosure.

FIG. 4 is a schematic diagram illustrating exemplary compensation regions and a reference region according to some embodiments of the present disclosure. As shown in FIG. 4, a target block 400 may be divided into 4 regions including a region 410, a region 420, a region 430, and a region 440. The region 410 located at an upper left corner of the target block 400 may be the upper left compensation region. The region 420 located at an upper part of the target block 400 may be the upper compensation region. The region 430 located at a left part of the target block 400 may be the left compensation region. In addition, as shown in FIG. 4, heights or widths of the region 410, the region 420, the region 430, and the region 440 may not be equal.

As shown in FIG. 4, a first reference region may be located outside the target block 400 and close to the first boundary 401 of the target block 500. The first reference region may include x column of pixels (e.g., $D_1, D_2, \ldots,$ and $D_x$). The second reference region may be located outside the target block 400 and close to the second boundary 402 of the target block 500. The second reference region may include y row of pixels (e.g., $C_1, C_2, \ldots,$ and $C_y$).

Figure 5:
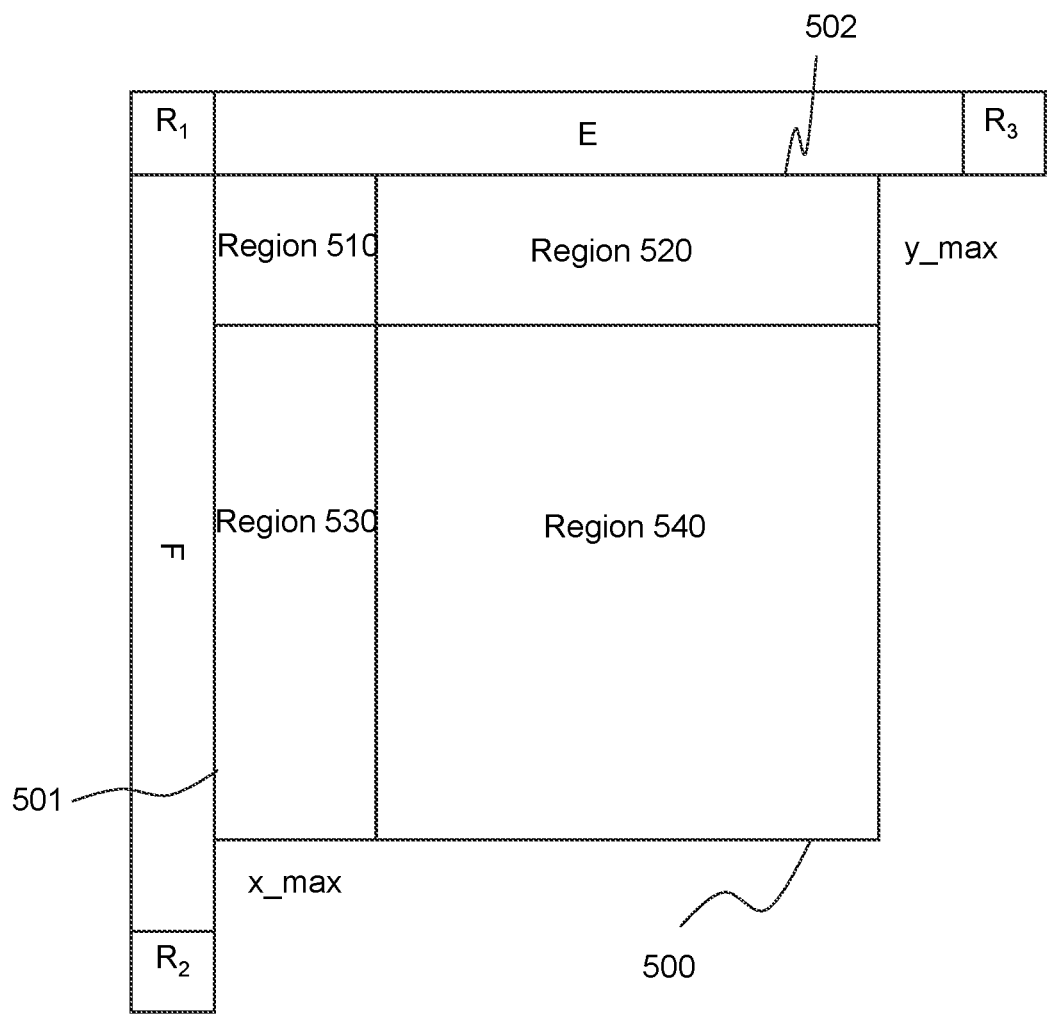
FIG. 5 is a schematic diagram illustrating exemplary target regions and a reference region according to some embodiments of the present disclosure.

FIG. 5 is a schematic diagram illustrating exemplary compensation regions and a reference region according to some embodiments of the present disclosure. As shown in FIG. 5, the division of a target block 500 and the compensation regions in FIG. 5 are similar to that in FIG. 5.

As shown in FIG. 5, a first reference region may be located outside the target block 500 and close to the first boundary 501 of the target block 500. The first reference region may include one column of pixels (e.g., F) and pixels $R_1$ and $R_2$ respectively adjacent to two sides of the column of pixels (e.g., F). The second reference region may be located outside the target block 500 and close to the second boundary 502 of the target block 500. The second reference region may include one row of pixels (e.g., E) and pixels $R_1$ and $R_3$ respectively adjacent to two sides of the row of pixels (e.g., E).

Figure 6:
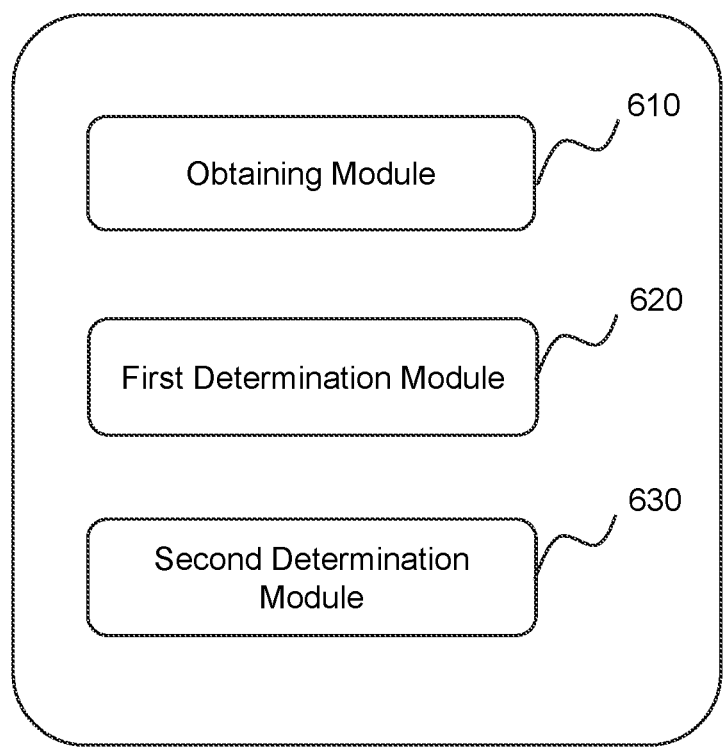
FIG. 6 is a block diagram illustrating an exemplary video processing system according to some embodiments of the present disclosure.

FIG. 6 is a block diagram illustrating an exemplary video processing system according to some embodiments of the present disclosure. As shown in FIG. 6, a video processing system 600 may include an obtaining module 610, a first determination module 620, and a second determination module 630.

The obtaining module 610 may be configured to obtain a target block that has been predicted in an image frame. More descriptions regarding the obtaining of the target block that has been predicted may be found elsewhere in the present disclosure, for example, operation 210 in FIG. 2 and relevant descriptions thereof.

The first determination module 620 may be configured to determine one or more target regions to be compensated from the target block. More descriptions regarding the determining of the one or more target regions to be compensated may be found elsewhere in the present disclosure, for example, operation 220 in FIG. 2 and relevant descriptions thereof.

The second determination module 620 may be configured to determine, for a target region of the one or more target regions, an updated predictive value of the target region based on the predictive value of the target region and pixel values of pixels in a reference region corresponding to the target region. More descriptions regarding the determining of the updated predictive value of the target region may be found elsewhere in the present disclosure, for example, operation 230 in FIG. 2 and relevant descriptions thereof.

The modules in the video processing system 600 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. In some embodiments, two or more of the modules may be combined as a single module, and any one of the modules may be divided into two or more units.

Figure 7:
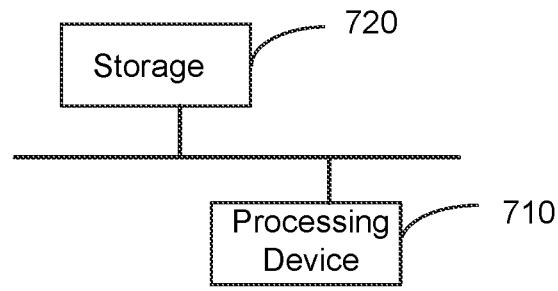
FIG. 7 is a schematic diagram illustrating an exemplary video processing device according to some embodiments of the present disclosure.

FIG. 7 is a schematic diagram illustrating an exemplary video processing device according to some embodiments of the present disclosure. In some embodiments, the video processing system 100 and/or the video processing system

600 may be implemented by software and/or hardware, and/or may be integrated into the video processing device 700.

As shown in FIG. 7, the video processing device 700 may include a processing device 710 (also referred to as a processor). The processing device may be configured to process information and/or data relating to the image prediction to perform one or more functions described in the present disclosure. For example, the processing device 710 may be configured to implement any one of the embodiments or any combination thereof in the present disclosure.

In some embodiments, the processing device 710 may include a central processing unit (CPU). In some embodiments, the processing device 710 may include an integrated circuit chip configured to process signals. In some embodiments, the processing device 710 may include a general-purpose processor, a digital signal processor (DSP), an application specific integrated circuit (ASIC), a field programmable gate array (FPGA), other programmable logic device, a discrete gate, a transistor logic device, a discrete hardware component, or the like, or any combination thereof. The general-purpose processor may include a microprocessor. In some embodiments, the processing device 710 may include any conventional processor.

In some embodiments, the video processing device 700 may include a storage 720. The storage 720 may be configured to store instructions and/or data required for operations of the processing device 710. In some embodiments, the storage 720 may include a medium that may store program codes, such as a U disk, a mobile hard disk, a read-only memory (ROM), a random access memory (RAM), a magnetic disk, an optical disk, or the like, or any combination thereof. In some embodiments, the storage 720 may include terminal devices such as a computer, a server, a mobile phone, a tablet, or the like, or any combination thereof.

Figure 8:
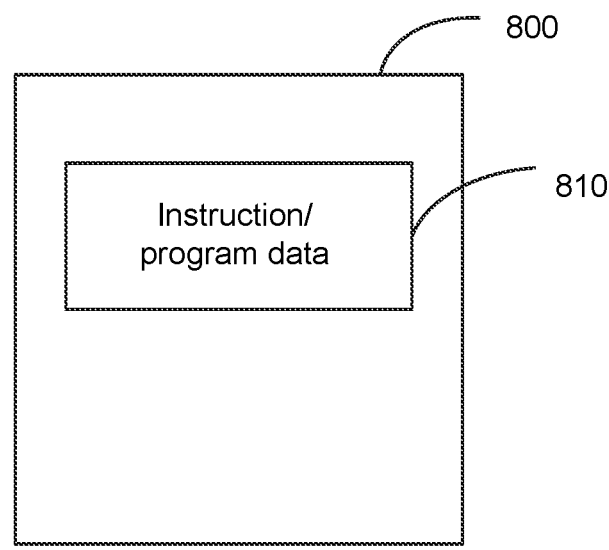
FIG. 8 is a schematic diagram illustrating an exemplary computer-readable storage medium according to some embodiments of the present disclosure.

FIG. 8 is a schematic diagram illustrating an exemplary computer-readable storage medium according to some embodiments of the present disclosure. The computer-readable storage medium 800 may be configured to store instruction/program data 810. When the instruction/program data 810 is executed, any one of the embodiments of the image prediction method may be implemented. In some embodiments, the instruction/program data 810 may be in a form of a program file and stored in the storage 820 in a form of a software product. A computer device (e.g., the video processing system 100, the image prediction system 600, the video processing device 700) personal computer, a server, or a network device, etc.) or a processor may perform all or part of the operations of the embodiments of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or collocation of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations thereof, are not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A method implemented on a computing device including at least one processor and a storage device, comprising:
   obtaining a target block that has been predicted in an image frame;
   determining, from the target block, one or more target regions to be compensated, the one or more target regions being adjacent to at least one boundary of the target block, each of the one or more target regions having a predictive value, wherein the predictive value of the each of the one or more target regions includes an intra predictive value, an inter predictive value, or the intra predictive value and the inter predictive value; and
   for a target region of the one or more target regions, determining an updated predictive value of the target region based on the predictive value of the target region and pixel values of pixels in a reference region corresponding to the target region; wherein the one or more target regions include a compensation region located at an upper left corner of the target block and adjacent to a first boundary and a second boundary of the target block, the first boundary and the second boundary of the target block being perpendicular to each other; the updated predictive value of the target region is determined based on a combined inter and intra combination prediction technique, including:
     obtaining an updated intra predictive value of the target region by correcting the intra predictive value of the target region based on the reference region;
     determining a target motion vector based on a current motion vector of the target block and a plurality of motion offsets;
     determining an updated inter predictive value of the target region based on the target motion vector; and
     determining the updated predictive value of the target region based on the updated intra predictive value of the target region and the updated inter predictive value of the target region.

2. The method of claim 1, wherein the reference region corresponding to the compensation region includes at least one column of pixels located outside the target block and close to the first boundary of the target block and at least one row of pixels located outside the target block and close the second boundary of the target block.

3. The method of claim 1, wherein for the target region of the one or more target regions, the determining the updated predictive value of the target region based on the predictive value of the target region and the pixel values of the pixels in the reference region corresponding to the target region includes:
   determining the updated predictive value of the target region by performing, based on first weights, a weighted averaging operation on the predictive value of the target region and the pixel values of the pixels in the reference region corresponding to the target region.

4. The method of claim 1, wherein the determining, from the target block, the one or more target regions to be compensated includes:
   obtaining, from the target block, a plurality of candidate regions with different sizes;
   for each of the plurality of candidate regions,
     determining an updated predictive value of the candidate region; and
     determining a cost corresponding to the candidate region based on the updated predictive value of the candidate region; and
   comparing costs corresponding to the plurality of candidate regions; and
   designating, from the plurality of candidate regions, a candidate region with a smallest cost as the target region.

5. The method of claim 1, wherein the method further includes:
   determining an updated predictive value of the target block by performing, based on third weights, a weighted averaging operation on a predictive value of the target block and the pixel values of the pixels in the reference region corresponding to the target block; and
   updating the updated predictive value of the target region by performing, based on fourth weights, a weighted averaging operation on the updated predictive value of the target block and the updated predictive value of the target region.

6. The method of claim 1, wherein the obtaining the updated intra predictive value of the target region by correcting the intra predictive value of the target region based on the reference region includes:
   determining the updated intra predictive value of the target region by correcting the intra predictive value of the target region based on the pixel values of the pixels in the reference region and weights of the pixel values of the pixels in the reference region.

7. A system, comprising:
   at least one storage device storing executable instructions, and
   at least one processor in communication with the at least one storage device, when executing the executable instructions, causing the system to perform operations including:
     obtaining a target block that has been predicted in an image frame;
     determining, from the target block, one or more target regions to be compensated, the one or more target regions being adjacent to at least one boundary of the target block, each of the one or more target regions having a predictive value, wherein the predictive value of the each of the one or more target regions includes an intra predictive value, an inter predictive value, or the intra predictive value and the inter predictive value; and
     for a target region of the one or more target regions, determining an updated predictive value of the target region based on the predictive value of the target region and pixel values of pixels in a reference region corresponding to the target region;

wherein the one or more target regions include a compensation region located at an upper left corner of the target block and adjacent to a first boundary and a second boundary of the target block, the first boundary and the second boundary of the target block being perpendicular to each other; the updated predictive value of the target region is determined based on a combined inter and intra combination prediction technique, including:

obtaining an updated intra predictive value of the target region by correcting the intra predictive value of the target region based on the reference region;

determining a target motion vector based on a current motion vector of the target block and a plurality of motion offsets;

determining an updated inter predictive value of the target region based on the target motion vector; and determining the updated predictive value of the target region based on the updated intra predictive value of the target region and the updated inter predictive value of the target region.

8. The system of claim 7, wherein the determining, from the target block, the one or more target regions to be compensated includes:

obtaining, from the target block, a plurality of candidate regions with different sizes;

for each of the plurality of candidate regions,
determining an updated predictive value of the candidate region; and
determining a cost corresponding to the candidate region based on the updated predictive value of the candidate region; and
comparing costs corresponding to the plurality of candidate regions; and
designating, from the plurality of candidate regions, a candidate region with a smallest cost as the target region.

9. The system of claim 7, wherein the operations further include:

determining an updated predictive value of the target block by performing, based on third weights, a weighted averaging operation on a predictive value of the target block and the pixel values of the pixels in the reference region corresponding to the target block; and updating the updated predictive value of the target region by performing, based on fourth weights, a weighted averaging operation on the updated predictive value of the target block and the updated predictive value of the target region.

10. The system of claim 7, wherein the obtaining the updated intra predictive value of the target region by correcting the intra predictive value of the target region based on the reference region includes:

determining the updated intra predictive value of the target region by correcting the intra predictive value of the target region based on the pixel values of the pixels in the reference region and weights of the pixel values of the pixels in the reference region.

11. The system of claim 7, wherein a size of the each of the one or more target regions is determined based on a size of the target block.

12. The system of claim 7, wherein the determining the target motion vector based on the current motion vector of the target block and the plurality of motion offsets includes:

determining a plurality of candidate motion vectors by correcting the current motion vector of the target block using the plurality of motion offsets; and selecting, from the plurality of candidate motion vectors, a candidate motion vector corresponding to a smallest predicted cost as the target motion vector.

13. A non-transitory computer readable medium, comprising a set of instructions, wherein when executed by at least one processor, the set of instructions direct the at least one processor to effectuate a method, the method comprising:

obtaining a target block that has been predicted in an image frame;

determining, from the target block, one or more target regions to be compensated, the one or more target regions being adjacent to at least one boundary of the target block, each of the one or more target regions having a predictive value, wherein the predictive value of the each of the one or more target regions includes an intra predictive value, an inter predictive value, or the intra predictive value and the inter predictive value; and for a target region of the one or more target regions, determining an updated predictive value of the target region based on the predictive value of the target region and pixel values of pixels in a reference region corresponding to the target region;

wherein the one or more target regions include a compensation region located at an upper left corner of the target block and adjacent to a first boundary and a second boundary of the target block, the first boundary and the second boundary of the target block being perpendicular to each other; the updated predictive value of the target region is determined based on a combined inter and intra combination prediction technique, including:

obtaining an updated intra predictive value of the target region by correcting the intra predictive value of the target region based on the reference region;

determining a target motion vector based on a current motion vector of the target block and a plurality of motion offsets;

determining an updated inter predictive value of the target region based on the target motion vector; and determining the updated predictive value of the target region based on the updated intra predictive value of the target region and the updated inter predictive value of the target region.

14. The method of claim 1, wherein the determining the target motion vector based on the current motion vector of the target block and the plurality of motion offsets includes:

determining a plurality of candidate motion vectors by correcting the current motion vector of the target block using the plurality of motion offsets; and selecting a candidate motion vector with a smallest predicted cost from the plurality of candidate motion vectors as the target motion vector.

15. The method of claim 14, wherein each of the plurality of motion offsets includes an offset amplitude and an offset direction, the offset amplitude being configured to correct a value of the current motion vector of the target block, the offset amplitude being denoted as a count of pixels for offset, and the offset direction being configured to correct a direction of the current motion vector of the target block.

16. The method of claim 1, wherein a size of the each of the one or more target regions is determined based on a size of the target block.

17. The system of claim 12, wherein each of the plurality of motion offsets includes an offset amplitude and an offset direction, the offset amplitude being configured to correct a value of the current motion vector of the target block, the offset amplitude being denoted as a count of pixels for offset, and the offset direction being configured to correct a direction of the current motion vector of the target block.

* * * * *